(12) United States Patent
Chauvel et al.

(10) Patent No.: US 7,712,098 B2
(45) Date of Patent: May 4, 2010

(54) DATA TRANSFER CONTROLLED BY TASK ATTRIBUTES

(75) Inventors: Gerard Chauvel, Antibes (FR); Serge Lasserre, Frejus (FR); Edward E. Ferguson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1203 days.

(21) Appl. No.: 10/157,773

(22) Filed: May 29, 2002

(65) Prior Publication Data

US 2003/0097394 A1    May 22, 2003

(30) Foreign Application Priority Data

Sep. 25, 2001    (EP)  ................................. 01402459

(51) Int. Cl.
*G06F 9/46* (2006.01)
*G06F 12/00* (2006.01)
(52) U.S. Cl. ........................ 718/102; 711/154; 711/156; 711/202; 711/206
(58) Field of Classification Search ......... 718/100–108; 713/190; 711/154–156, 202–208
See application file for complete search history.

(56) References Cited

U.S. PATENT DOCUMENTS

| | | | | |
|---|---|---|---|---|
| 4,493,028 A | * | 1/1985 | Heath | 710/1 |
| 4,901,232 A | * | 2/1990 | Harrington et al. | 710/6 |
| 4,939,644 A | * | 7/1990 | Harrington et al. | 710/5 |
| 5,353,431 A | * | 10/1994 | Doyle et al. | 711/206 |
| 5,487,154 A | * | 1/1996 | Gunji | 710/22 |
| 5,615,263 A | * | 3/1997 | Takahashi | 713/164 |
| 5,956,753 A | * | 9/1999 | Glew et al. | 711/205 |
| 6,029,209 A | * | 2/2000 | Cornaby et al. | 710/5 |
| 6,085,258 A | * | 7/2000 | Dreyer et al. | 710/5 |
| 6,098,061 A | * | 8/2000 | Gotoh et al. | 706/50 |

(Continued)

FOREIGN PATENT DOCUMENTS

EP    0 829 820 A2    3/1998

(Continued)

*Primary Examiner*—Meng-Ai An
*Assistant Examiner*—Jennifer N To
(74) *Attorney, Agent, or Firm*—Wade J. Brady, III; Frederick J. Telecky, Jr.

(57) ABSTRACT

A digital system and method of operation is provided in which several processors (440, 450) are connected to a shared memory resource (460). Translation lookaside buffers (TLB) (400, 402) are connected to receive a request address (404*a-n*) from each respective processor. Each TLB has a set of entries that correspond to pages of address space. Each entry provides a set of task memory attributes (TMA) (412*a-n*) for the associated page of address space. Task memory attributes are defined by a task control block associated with a currently executing task. For each memory transfer request, the TLB accesses an entry corresponding to the request address and provides a translated physical memory address and a task memory attribute value associated with that requested address space page. Functional circuitry (470) performs pre/post-processing on data that is being transferred between a processor and the memory in accordance with the task memory attribute value provided by the TLB with each memory transfer request. Thus, data accessed at the same address by different tasks on a same processor or on different processors can be pre-processed or post-processed in a manner defined by a task control block. Such pre/post-processing may include compression/decompression, encryption/decryption, or formatting, for example.

15 Claims, 9 Drawing Sheets

U.S. PATENT DOCUMENTS

| | | |
|---|---|---|
| 6,170,023 B1 * | 1/2001 | Beardsley et al. ............ 710/36 |
| 6,289,413 B1 * | 9/2001 | Rogers et al. ............... 711/105 |
| 6,314,486 B1 * | 11/2001 | Schulz et al. ............... 710/310 |
| 6,418,521 B1 * | 7/2002 | Mathews et al. ............ 711/207 |
| 6,684,280 B2 * | 1/2004 | Chauvel et al. ............. 710/244 |
| 6,957,315 B2 * | 10/2005 | Chauvel ...................... 711/207 |
| 7,190,284 B1 * | 3/2007 | Dye et al. .................... 341/51 |
| 2002/0069327 A1 * | 6/2002 | Chauvel ...................... 711/130 |

FOREIGN PATENT DOCUMENTS

| | | |
|---|---|---|
| WO | WO 97/23828 | 7/1997 |
| WO | WO 99/03040 | 1/1999 |

* cited by examiner

DATA TRANSFER CONTROLLED BY TASK ATTRIBUTES

This application claims priority to European Application Serial No. 01402459.0, filed Sep. 25, 2001. U.S. patent application Ser. No. 09/932,651, which is now U.S. Pat. No. 6,751,706, is incorporated herein by reference.

FIELD OF THE INVENTION

This invention generally relates to microprocessors, and more specifically to improvements in access and data transfer to storage resources, systems, and methods of making.

BACKGROUND

Microprocessors are general-purpose processors that provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality that may not be provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command. A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time, or may process multiple tasks simultaneously.

Various tasks may operate on a set of data stored in memory. The various tasks may be executed on various processors that have shared access to the memory. Accordingly, there is needed a system and method for managing task processing that takes into account resource capabilities and capacity, and other task processing needs.

SUMMARY OF THE INVENTION

Particular and preferred aspects of the invention are set out in the accompanying independent and dependent claims. In accordance with a first embodiment of the invention, a method is provided for transferring data between a storage resource and an initiator resource. A task memory attribute (TMA) value is associated with a program task and the task is executed. During execution of the task, a data transfer request is initiated from the initiator resource by providing an address value and the TMA value. A data item is then transferred between the initiator resource and the storage resource in a manner indicated by the TMA value.

Data accessed at the same address by different tasks on a same processor or on different processors can be pre-processed or post-processed in a manner specified by the TMA value. Such pre/post-processing may include compression/decompression, encryption/decryption, or formatting, for example.

In another embodiment, a task identification value is also associated with the program task and provided with each data transfer request. In this case, pre/post processing of a data item being transferred is responsive to both the TMA value and the task identification value.

In another embodiment, a digital system is provided that has an initiator resource connected to a storage resource; the initiator resource is operable to provide a data transfer request to the storage resource. Attribute circuitry is connected to the initiator resource and is operable to provide a task memory attribute (TMA) value with each data transfer request. For each data transfer request, the attribute circuitry provides a TMA value that is in accordance with a program task being executed at the time each data transfer request is initiated.

A transformation circuit is connected between the storage resource and the initiator resource in a manner that data transferred between the initiator resource and the storage resource in response to a data transfer request can be transformed by the transformation circuit. The transformation circuit performs pre/post processing on the data being transferred in responsive to the TMA value provided with each data transfer request.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
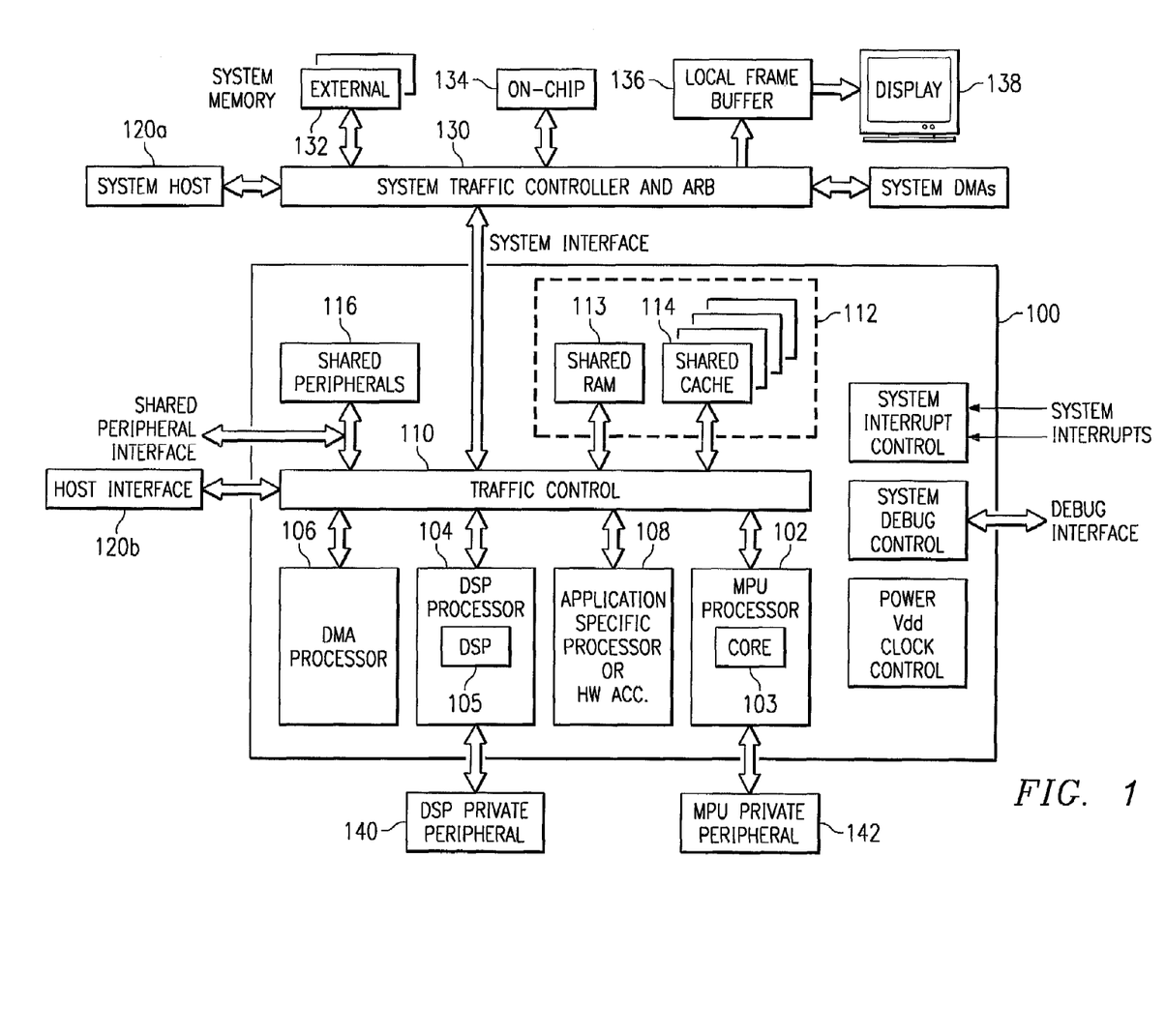
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources a system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
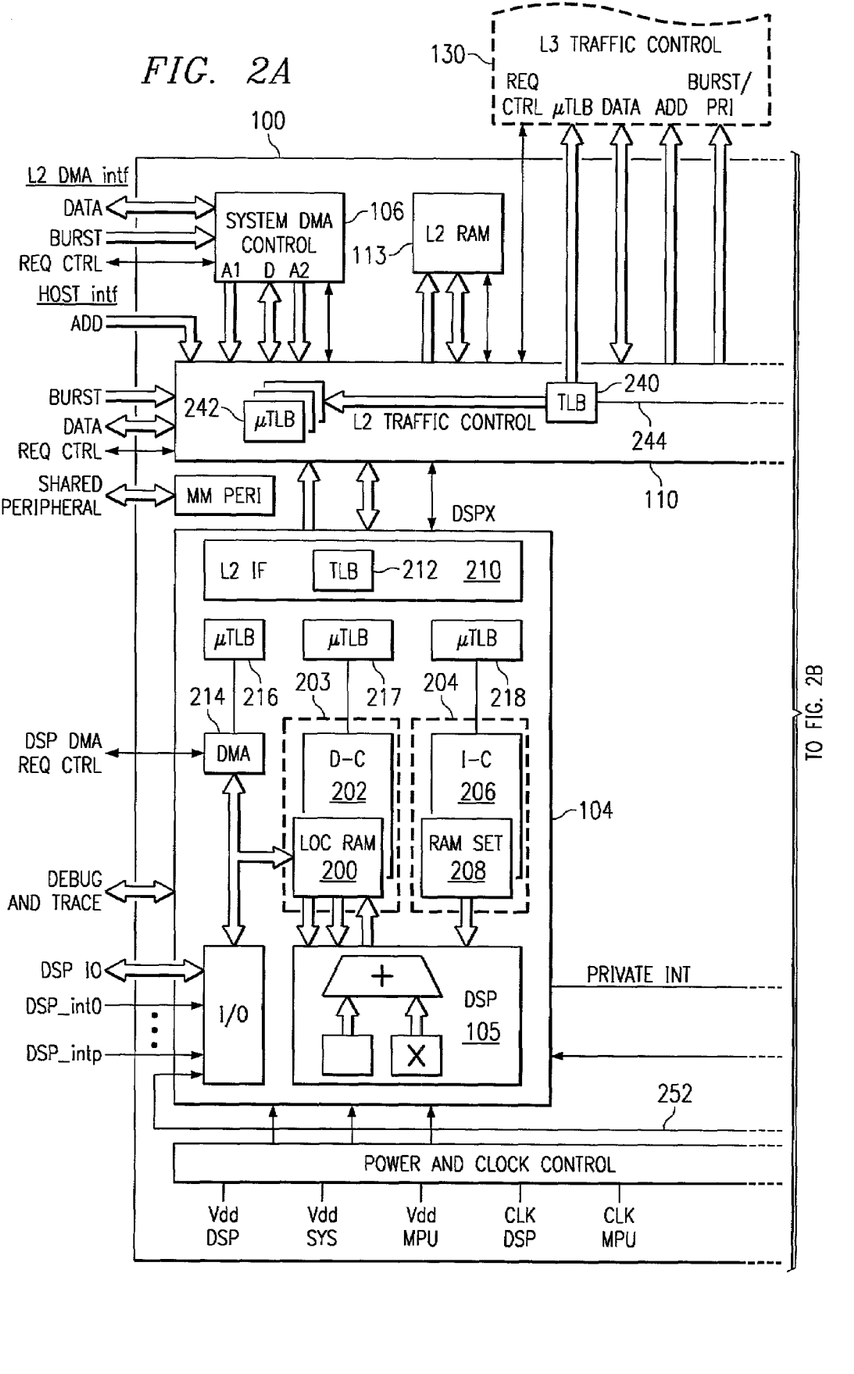
FIGS. 2A and 2B together is a more detailed block diagram of the megacell core of FIG. 1.
Figure 2B:
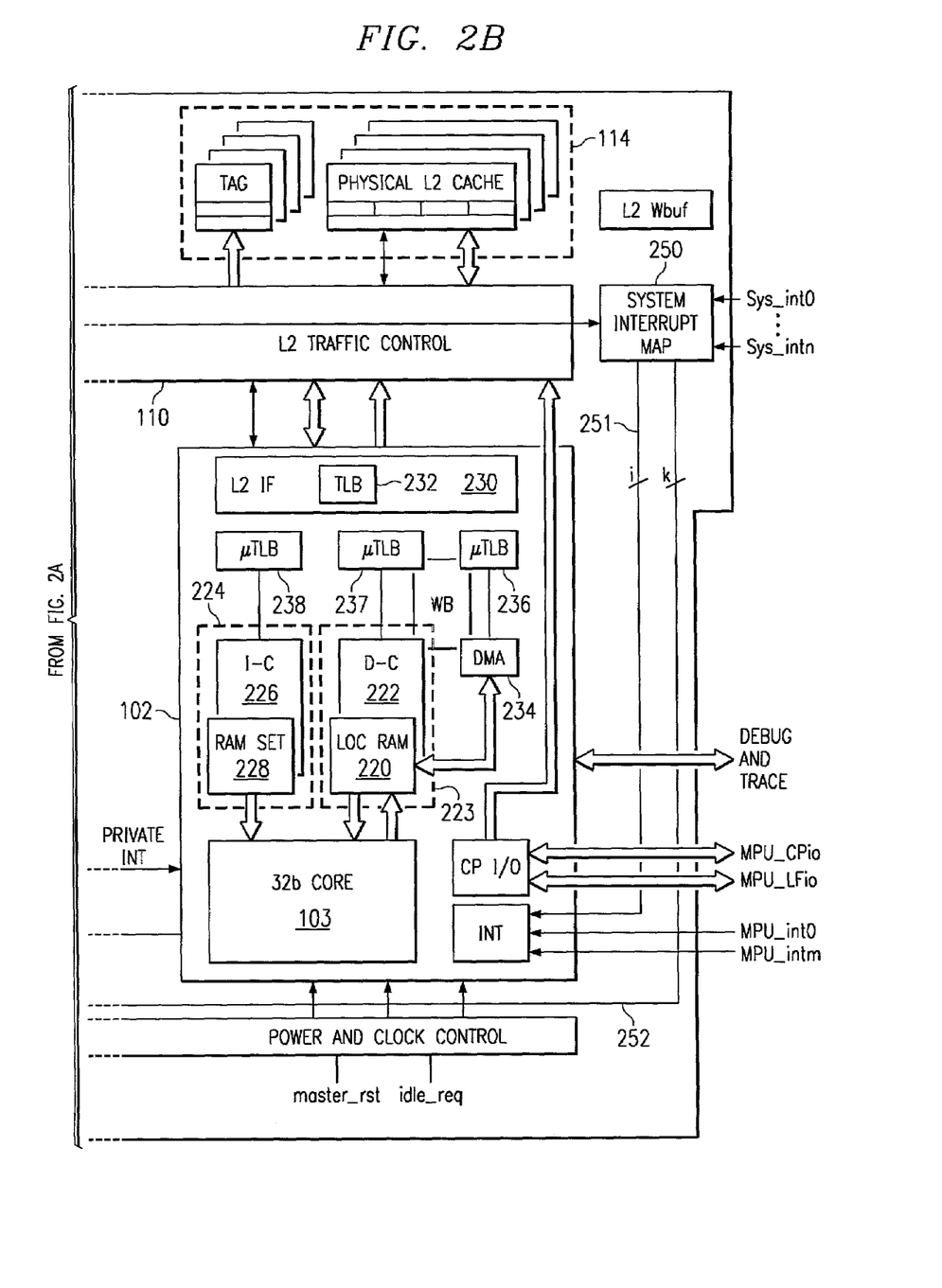

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216-218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236-238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation look-aside buffer (TLB) caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of a resource identification (R-ID) field. On a slave processor such as a hardware accelerator the R-ID is equal to the R-ID of the master CPU.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Victim location selection is done by software or with hardware support using methods known by persons skilled in the art.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252. Translation tables and TLB cache contents must be kept consistent. A flush operation is provided for this reason.

An address reference is generally located within the µTLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/µTLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provide additional information, such as memory access permission and access priority as described later.

All megacell memory accesses are protected by a TLB. As they all have different requirements in term of access frequencies and memory size, a shared TLB with individual µTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) with several domains corresponding to each processor but only a single table manager for all processors. Slave processors do not manage the tables. In a first embodiment slave processors R-ID are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X can not access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-Ids are managed by a single master CPU. This CPU can make TLB operations on all TLB entries. TLB operation or memory accesses from slave processor are restricted by their own R-ID. The CPU master will have rights to flush out entries belonging to another processor in a different OS domain.

The organization of the data structures supporting the memory management descriptor is flexible since a software TLB-miss handler resolves each TLB miss. These data structures include the virtual-to-physical address translation and additional descriptors to manage the memory hierarchy. An example list of these descriptors and their function is described in Table 1. Various memory access permission attributes can be specified. In other embodiments, a processor may have other modes that enable access to memory without permission checks. Similarly, other embodiments may provide more or fewer permission attributes and/or more or fewer memory management descriptors.

TABLE 1

| Memory Management Descriptors | |
| --- | --- |
| Memory Access Permissions attributes | Supervisor: no access, read only, read/write<br>User: no access, read only, read/write |
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |

MMU/TLB Control Operation

Figure 3:
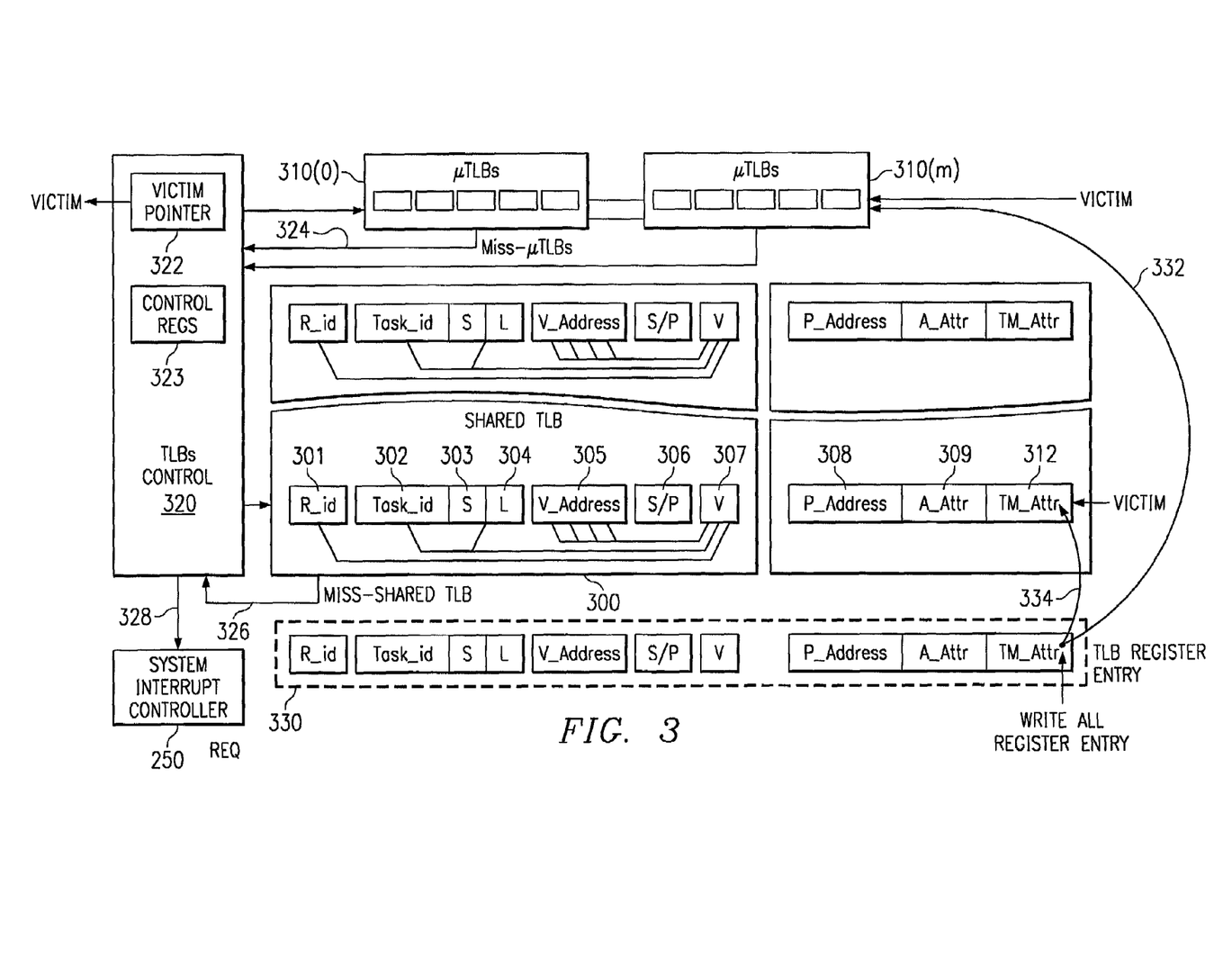
FIG. 3 is a block diagram illustrating a shared translation lookaside buffer (TLB) and several associated micro-TLBs (μTLB) included in the megacell of FIG. 2.

FIG. 3 is a block diagram illustrating a shared translation look-aside buffer (TLB) 300 and several associated micro-TLBs (µTLB) 310(0)-310(n) included in megacell 100 of FIG. 2. On a µTLB miss, the shared TLB is first searched. TLB controller 320 is alerted by asserting a µTLB miss signal 324. In case of a hit on the shared TLB, the µTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor who's OS supervises the resource that caused the miss. A TLB entry register 330 associated with TLB controller 320 is loaded by a software TLB handler in response to the interrupt. Once loaded, the contents of TLB entry register 330 are transferred to both shared TLB 300 and the requesting µTLB at a selected victim location as indicated by arcs 332 and 334.

A separate TLB entry register 330 is only one possible implementation and is not necessarily required. The separate TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other uTLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,
2—the software TLB handler sends a command to write the TLB entry, which transfers a value from TLB entry register to a preselected victim TLB cache entry; and
3—control circuitry checks and preselects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.
2—the software TLB handler writes to the TLB entry register, and
3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and µTLB to provide a victim separate pointer for each. A typical embodiment will use a round robin scheme. Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the shared TLB, for example.

In this embodiment, each shared TLB has 256 entries. Each µTLB is generally much smaller, i.e., has fewer entries, than the shared TLB. In various embodiments, each shared TLB has 64-256 or more entries while µTLBs generally have 4-16 entries. The penalty for a miss in a µTLB is small since a correct entry is generally available from the shared TLB. Therefore, the present embodiment does not provide direct control of the victim pointers of the various µTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each resource; such as R-ID register 442a associated with resource 440 and R-ID register 442n associated with resource 450 of FIG. 4. Resource 440 is representative of various DMA engines, coprocessor, etc within megacell 100 and/or an external host connected to megacell 100. Resource 450 is representative of various processors within megacell 100. Each resource 440, 450 typically has its own associated R-ID register; however, various embodiments may choose to provide resource ID registers for only a selected portion of the resources. A task ID is provided by a task-ID register, such as task-ID register 444a associated with resource 440 and task-ID register 444n associated with resource 450. A task register associated with a non-processor resource, such as DMA, a coprocessor, etc, is loaded with a task value to indicate the task that it is supporting.

In another embodiment, only processor resources 440, 450 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task_ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

Referring again to FIG. 3, each TLB entry includes a virtual address field 305 and a corresponding physical address field 308 and address attributes 309. Various address attributes are described in Table 1. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry. Each TLB entry also includes "shared" bit 303 and a lock bit 304. All entries marked as shared can be flushed in one cycle globally or within a task.

In this embodiment of the invention, each TLB also includes a task related memory attribute field 312, referred to as "task memory attribute" (TMA), the operation of which will be described in more detail below. Advantageously, a TMA value is provided along with a translated physical address for each transaction request.

A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable compare logic for each associated field.

As mentioned earlier, the resource ID field and task ID field in each entry of the TLB/μTLB can be used to improve security. During program task execution, each transaction request is checked by the miss control circuitry of the TLB/μTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Figure 7:
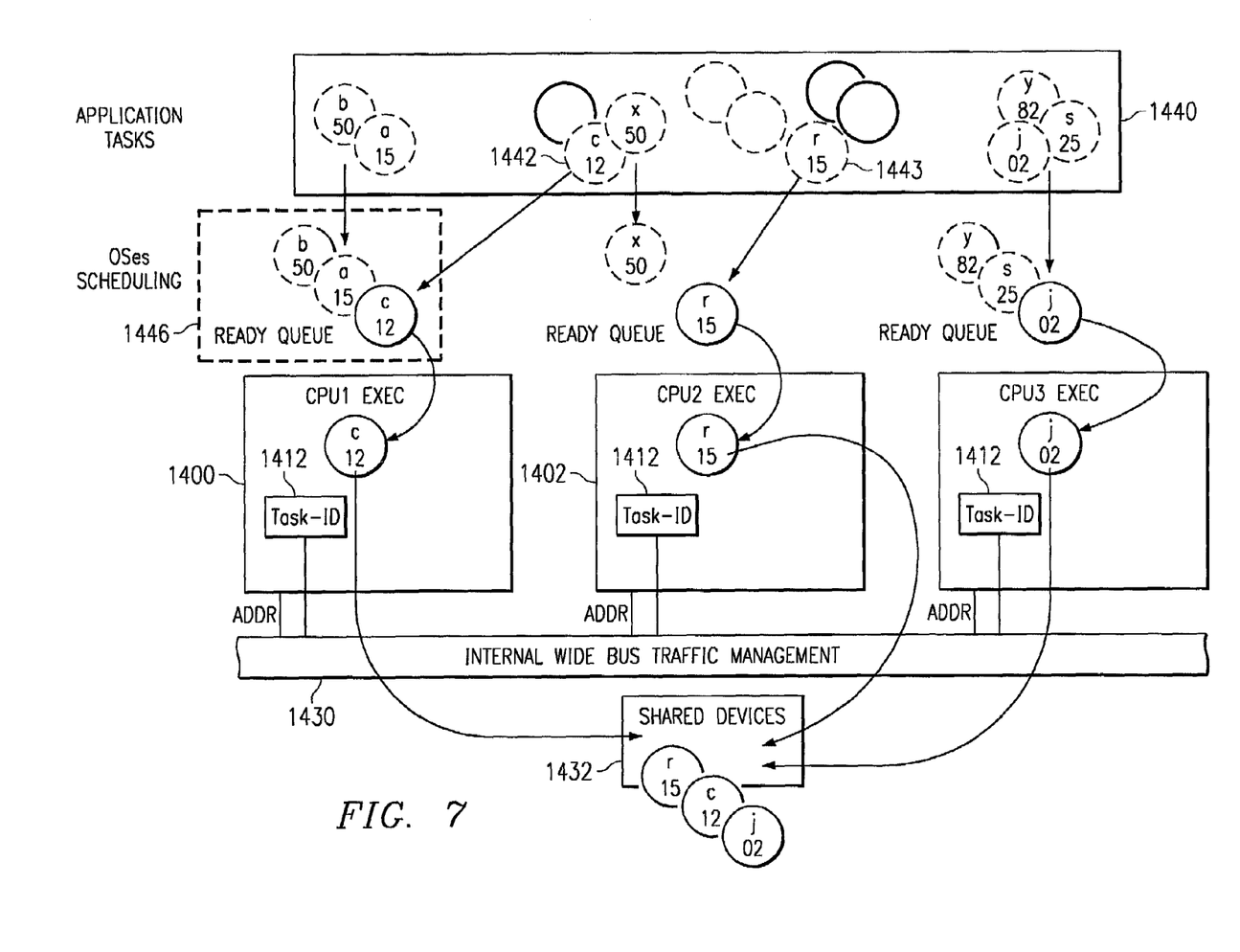
FIG. 7 is a block diagram of a digital system similar to that of FIG. 1 illustrating a cloud of tasks that are scheduled for execution on the various processors of the digital system.

FIG. 7 is a block diagram of a digital system similar to that of FIG. 1 illustrating cloud of tasks that are scheduled for execution on the various processors of the digital system. Typically, each software task includes a task priority value that is commonly used by an operating system to schedule an order of execution for a set of pending tasks 1440.

In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. The Task ID register in each processor is loaded when a task is invoked.

Table 2 illustrates several portions of an example instruction code sequences in which a task is spawned. From line 1 to line 5, task "c" is active and spawns a new task, "audio" on line 5. The kernel is then invoked to instantiate the new task and create an associated task control block (TCB). A TCB is a control structure that is stored in memory; a separate TCB is used to identify each instantiation of a task, as is generally known. An eight-bit (numbers of bits can be more or less in other embodiments) task-ID field is stored in the TCB at line 11. At line 12, a task memory attribute value is stored in the TCB.

During the context switch (reschedule in line 14) before launching the "audio" task, the kernel loads task-ID register 1412 with the task-ID value held in the TCB (Table 3) or in another table. At line 15, the new task is now active.

TABLE 2

Setting Task ID at the Start of a Task

```
1   // (Task c code execution)
2   Instruction 1
3   ------
4   instruction n
5   Taskspawn("audio",200,0,5000,(FUNCPTR)audio,// (Task ccode
      execution: instruction n+2)
6        //(Kernel code execution)
7        ------
8        TaskCreate( )
9            //(taskcreate code execution)
10           ------
11           SetTaskAttributeID(TID)
12           SetTaskAttributeMA(TMA)
13           ------
14       // Kernel reschedule code execution
15  //(Task Audio code execution)
16  Instruction 1
17  ------
```

As the new task begins to execute, data transfer requests to memory are initiated by either a processor that is executing the task, or by other initiator resources such as a DMA resource in support of the task. Since this is a new task, misses may occur in the TLB due to new pages of memory being accessed by the new task. Of course, if the task had been previously executed, correct page entries may already be present in the TLB. Also, as described below, if the new task accesses a page of memory that has previously been accessed by another task and the page entry is still present in the TLB, a miss will still occur if the task-valid bit is set because the task-ID field does not match the new task-ID value provided by the initiator resource with each data transfer request. The MMU handler will be invoked to handle each of the TLB misses and will access, in addition to the standard MMU table, the TCB of the currently executing task in order to obtain TMA values for TMA field 312 of each new TLB entry that is handled.

Advantageously, by accessing TCBs to obtain TMA values to be included as memory attributes in each TLB entry, the contents of the operating system memory address translation tables are not impacted.

Table 3 is an example task control block that is used to define a task memory attribute value. Typically, the OS uses a 32-bit task-ID that is in fact an address that enables the OS to locate the task control block information. At line 4, an execution priority value is defined that is used by the operating system to schedule execution of the task. At line 5, a task-ID value is defined that is used to set the task ID register when the task is instantiated. At line 6, the task memory attribute is defined.

TABLE 3

Setting Task ID Using a TCB

```
1   TCB (task control block)
2   Typedef struct TCB
3   {
4       UINT OS-priority
5       UINT Task_ID
6       TMA Task memory attribute    // TMA composite "C" data type
                                      holding Task
                                      // Memory Information
7       ---
8   #if CPU_FAMILY == xx
9       EXC_INFO excinfo;
10      REG_SET regs;
11      ...
12  #endif
13  }
```

In other embodiments, other means than a TCB may be provided for storing the task ID for use by the OS or MMU handler, such as a table of task-IDs, for example.

Referring again to FIG. 3, task memory attribute field 312 can be set in response to information provided at line 6 of the TCB illustrated in Table 3. This information can be used directly by the MMU manager when loading a new entry in TLBs. In the present embodiment, TMA information is not maintained in page tables but is inserted by the TLB miss handler at the time of a TLB miss by using the task-ID value of the transaction request that caused the TLB miss to access the corresponding task control block. Other embodiments may use other means for setting the TMA field in the TLB entry, such as by storing this information in a separate table or in the MMU page tables, for example, but this might require multiple table entries for a same page if different tasks use the same page.

In the present embodiment, the valid bit associated with the task-ID field is loaded through the MMU table walk and is part of the MMU tables. Thus, when the TLB miss handler accesses a page table in response to a TLB miss, it queries the task-ID valid bit field of the MMU page table; if this bit field is asserted, then the TLB miss handler asserts the task-ID valid bit in the TLB entry and loads the task-ID value from the task-ID register of the requester that caused the TLB miss into task ID field 302. If the task-ID valid bit field of the MMU page table is not asserted, then the TLB miss handler de-asserts the task-ID valid bit in the TLB entry and the task-ID value from the task-ID register of the requester that caused the TLB miss is ignored. Thus, a page entry in the TLB can be made sensitive to the task-ID of a transaction request, or the task-ID can be ignored such that several tasks can use the same TLB entry.

Figure 4:
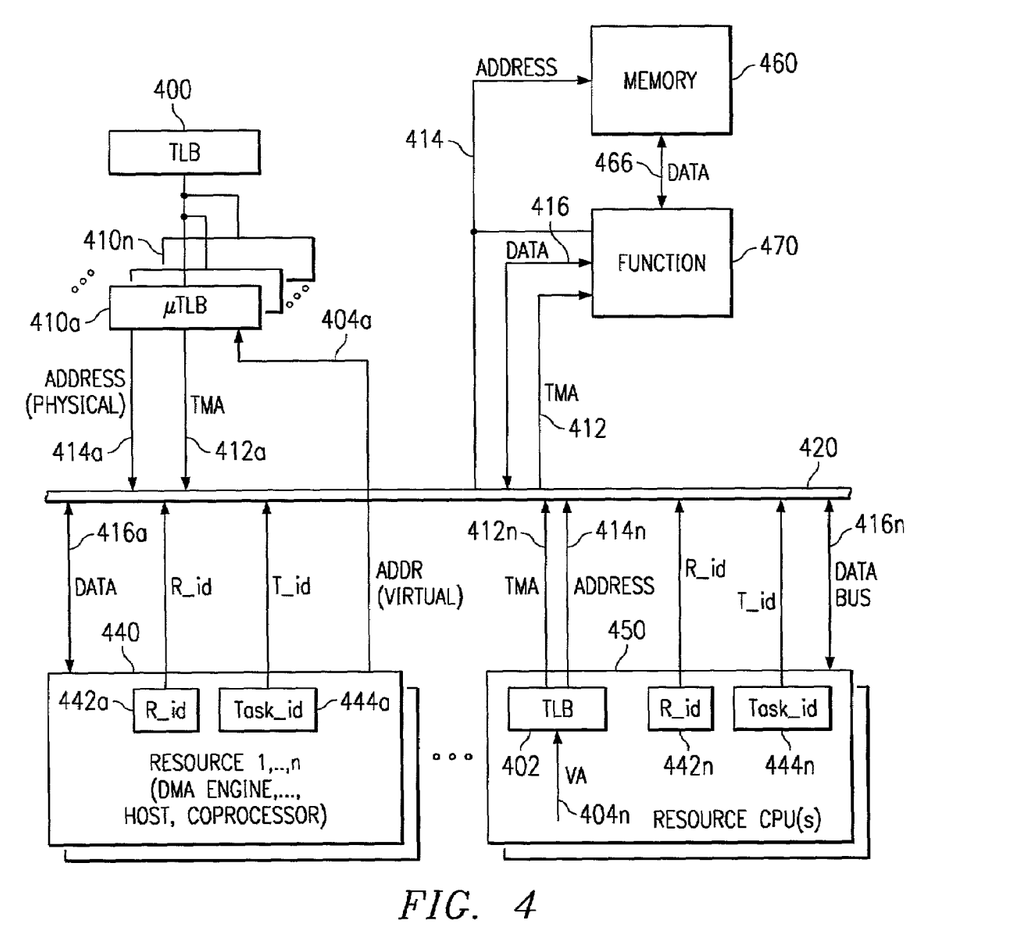
FIG. 4 is a block diagram of a digital system similar to FIG. 1 illustrating a functional unit that is responsive to task memory attributes.

FIG. 4 is a block diagram of a digital system similar to FIG. 1 illustrating a functional unit 470 that is responsive to task memory attribute values. As described above, each TLB 400, 402 or μTLB 410a-n provides a translated physical address 414a, 414n in response to virtual address value 404a, 404n provided by an initiator resource in a transaction request. Additionally, a TMA value 412a, 412n is provided by the TLB/μTLB along with the translated physical address. Traffic control circuitry 420 provides arbitration and passes the highest priority transaction request to storage resource 460. The transaction request includes a physical address value on address bus 414 and a TMA value on TMA bus 412.

Data bus 416-466 is arranged so that data being transferred between an initiator resource 440, 450 and storage resource 460 can be either pre-processed or post-processed by functional unit 470 in a manner that is defined by the TMA value provided by each transfer request. Advantageously, this allows data that is being transferred to a selected address in memory 460 by one task to be pre/post-processed in one manner, and data that is being transferred to the same address by another task on a same or different processor to be pre/post-processed in a different manner.

For example, in one embodiment, functional unit 470 performs compression/decompression using the TMA value as a guide. Data being written to memory is compressed if the TMA has a first value, or not compressed for another TMA value, for example. Compression could be specified to span just a 32-bit word of memory in response to a TMA value, or to span a longer quantity such as 256-bits in response to another TMA value, for example. For spanning larger regions, data bus 466 may be 256 bits, for example.

In another embodiment, functional unit 470 performs endianness byte swapping of data. In this case, one task can access a region of memory and transfer data that is arranged as big endian data. Another task can access the same region or a different region and transfer data that is arranged as little endian data. In this case, the TMA value specifies the desired endianness and functional unit 470 monitors several least significant address bits from address bus 414. Functional unit 470 then performs byte swapping in accordance with the TMA specified endianness and the proffered address bits.

In another embodiment, functional unit 470 performs encryption/decryption of data using a TMA key value directly as a key or indirectly as a means to select a key or as a pointer to a key, for example. As with compression, encryption may be embodied to cover just a data width corresponding to the width of data bus 416, or to a larger region by sizing data bus 466 accordingly.

In other embodiments, more than one functional unit can be provided and TMA field 312 can be defined as two or more sub-fields. In this case, each functional unit would be arranged to be responsive to selected bits of TMA bus 412, for example.

Figure 5:
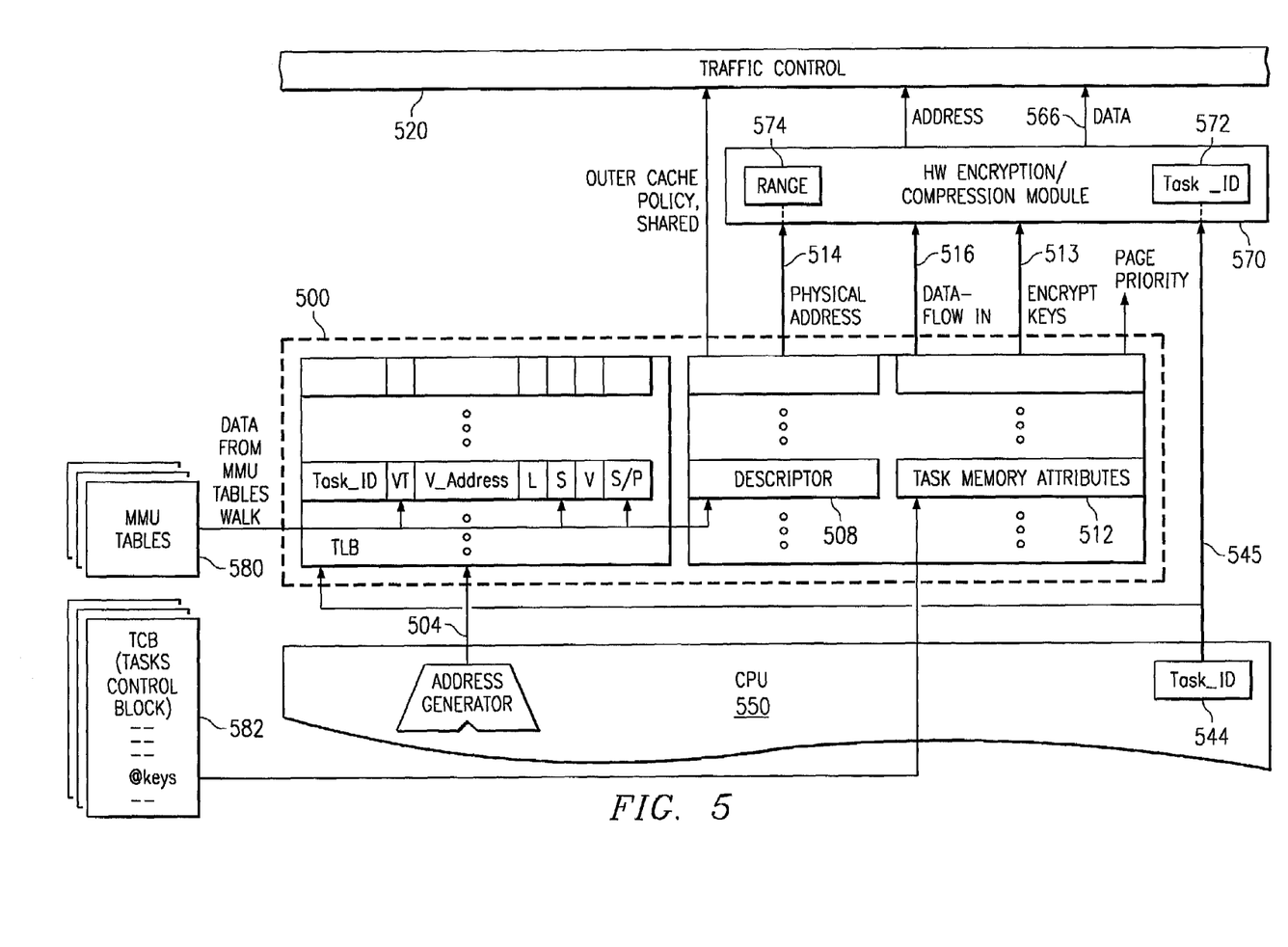
FIG. 5 is a block diagram of a digital system similar to FIG. 1 illustrating a functional unit that is responsive to task memory attributes and task-ID values.

FIG. 5 is a block diagram of a digital system similar to FIG. 1 illustrating a functional unit 570 that is responsive to task memory attributes and task-ID values. Traffic control circuitry 520 is similar to traffic control circuitry of 110 of FIG. 1. In this embodiment, functional unit 570 is proximate to processor core 550 such that pre/post-processing is performed on data only for the benefit of processor core 550. Advantageously, in various embodiments of the invention, a functional unit can either be shared such as functional unit 470, or private such as functional unit 570.

As described above, a portion of each entry in TLB 500 is loaded from MMU tables 580, such as translated address and descriptor field 508. Task memory attribute values are retrieved from a task control block 582 that is associated with a currently executing task and stored in TMA field 512 of each TLB entry.

In this example, functional unit 570 is an encryption unit and the TMA value provides on TMA bus 513 an encryption key or information to select the desired key. This example also includes address range register 574 and associated comparison logic that is used to specify a range of addresses within which encryption/decryption is performed. For addresses proffered on address bus 514 that are outside of a specified range, functional unit 570 passes data between processor core data bus 516 and the traffic controller on data bus 566 without modification. Address range register 574 is memory mapped and available to processor 550.

For a given task-id, there can be different TMA values depending on the address range. In this embodiment, the ranges of address correspond to pages. Therefore, several TLB entries may be used for the same task for the different pages, each of them having a different TMA value. The information resides in the TCB in a composite "C" Data type TMA that may hold several TMA values for several address ranges. Of course, other embodiments may equate an address range to something other than a page in an MMU, for example. Likewise, the various TMA values may be stored as separate entries in the TCB, for example.

In this example, functional unit 570 also includes task-ID register 572 and associated comparison logic that is used to specify a particular task for which encryption/decryption is performed. For task-ID values proffered on task-ID bus 545 from task register 544 that are different from a selected task-ID value, functional unit 570 passes data between processor core data bus 516 and the traffic controller on data bus 566 without modification. Task-ID register 572 is memory mapped and available to processor 550. In other embodiments, task-ID register 572 may be arranged to allow more than one task to be selected by providing multiple storage locations, for example.

Figure 6:
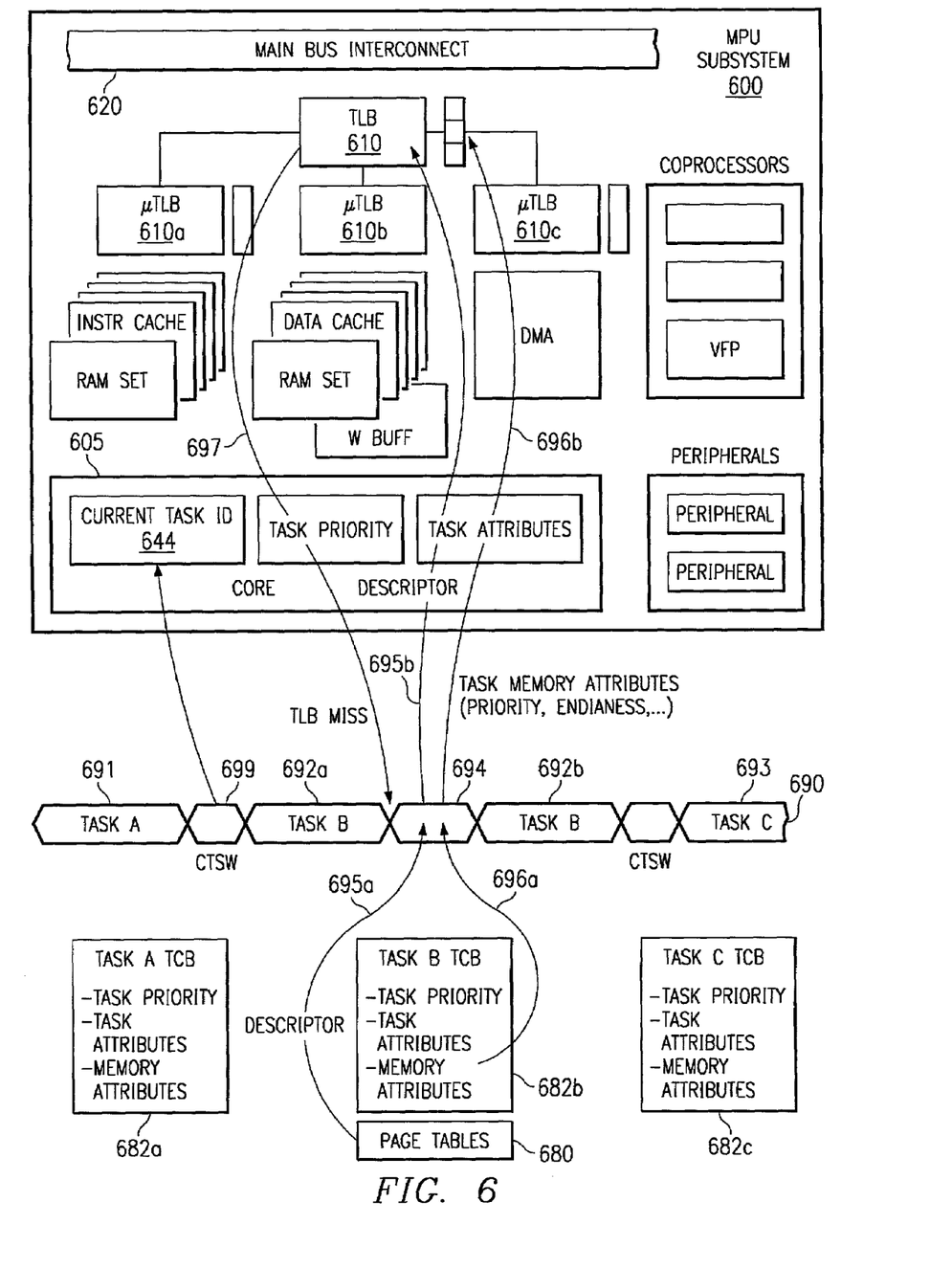
FIG. 6 is a combined timing diagram and flow diagram illustrating how task memory attributes are loaded into a memory management unit in the above systems.

FIG. 6 is a combined timing diagram and flow diagram illustrating how task memory attributes are loaded into a memory management unit in the above systems. Digital system 600 is a subsystem representative of any of the previously described processors, such as DSP 104 or MPU 102 of FIG. 1. Main bus interconnect 620 connects this processor subsystem to other subsystems. TLB 610 with associated μTLBs 610a-c operate as described previously. Task-ID register 644 provides a task-ID of a task being executed on processor core 605 as described previously. MMU page tables 680 are representative of earlier described MMU page tables. Task control block 682a is associated with task A, task control block 682b is associated with task B, and task control block 682c is associated with task C.

Timeline 690 illustrates sequential execution of three tasks. Task A executes during time period 691, task B executes during time periods 692a-b, and task C executes during time period 693. At each task transition, there is a context switch CTSW, such as during time period 699. As described previously, during each context switch, task-ID register 644 is loaded with a task-ID value of the new currently executing task.

When initiator resource 605 initiates a memory transfer request a page miss will occur if a corresponding page entry is not available in TLB 610, as represented during time period 694. An MMU handler task will then be invoked to handle the TLB miss. Page tables 680 will be accessed to provide a translated address and associated address attributes, as indicated at 695a and these will be loaded into TLB 610 as indicated at 695b. The TCB of the currently executing task, in this case task B, will be accessed in order to obtain a TMA value for the TMA field of the new TLB entry as indicated at 696a and this will be loaded into the TLB as indicated at 696b.

Advantageously, TMA values can be provided by the task control blocks without modifying MMU tables 680.

Digital System Embodiment

Figure 8:
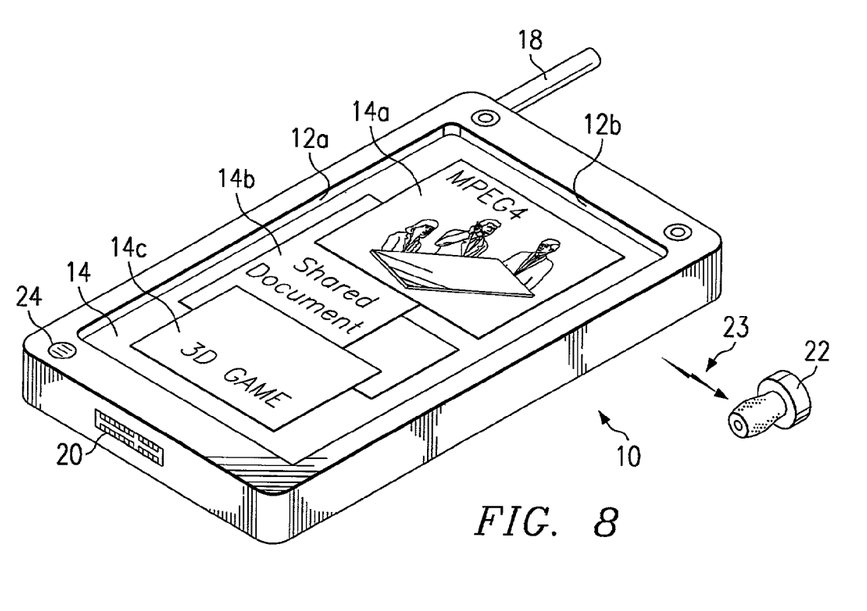
FIG. 8 is a representation of a telecommunications device incorporating an embodiment of the present invention.

FIG. 8 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 8, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

A storage resource is typically a memory or a cache; however, other resources may make use of pre/post-processing capabilities as described herein. For example, memory mapped input/output (I/O) devices and ports, graphical or video frame buffers, etc. An initiator resource is generally a processor or a DMA controller; however, other resources may initiate transfer requests, such as smart I/O devices or ports or bridges to other systems or subsystems.

While the invention has been described with reference to illustrative embodiments, this description is not intended to be construed in a limiting sense. Various other embodiments of the invention will be apparent to persons skilled in the art upon reference to this description. For example, various types of functional processors may be embodied to perform pre-processing and/or post-processing of data that is being transferred between an initiator resource and a storage resource in accordance with a task related memory attribute value.

It is therefore contemplated that the appended claims will cover any such modifications of the embodiments as fall within the true scope and spirit of the invention.

What is claimed is:

1. A method for transferring data in a digital system between a storage resource and an initiator resource, comprising the steps of:

for each computer executable program task, associating one or more task memory attribute (TMA) values with respective address ranges for the computer executable program task;

executing the program task;

in response to a data transfer request from the initiator resource to either read or write a data item to the storage resource, providing a TMA value corresponding to an address specified by the data transfer request and the task being executed at the time the data transfer request is initiated;

transferring the data item between the initiator resource and the storage resource, where:

for a write data transfer request, the data item is transformed in a manner indicated by the TMA value and the transformed data item is stored in the storage resource; and for a read data transfer request, the data item is read from the storage resource and transformed in a manner indicated by the TMA value and the transformed data item is passed to the initiator resource;

storing a translated page address value in an entry location in a memory management unit (MMU) by selecting the translated address value from a page table;

storing the TMA value with the translated page address value in the MMU entry location by obtaining the TMA value from a task control block associated with the program task; and using the MMU entry location to provide a translated address and the TMA value with the data transfer request.

2. The method of claim 1, further comprising the steps of:
associating a task identification value with the program task;
providing the task identification value with the data transfer request; and
wherein the step of transferring a data item is responsive to both the TMA value and the task identification value.

3. The method according to claim 1, further comprising the steps of:
storing a first task identification value associated with a first program task in a first MMU entry location, wherein the first MMU entry location also holds a first translated page address value and a first TMA value associated with the first program task;
executing a second program task that uses the first translated page value; and
creating a different MMU entry for the second program task by storing a second task identification value and a second TMA value associated with the second task along with the first translated page value in a second MMU entry location.

4. The method according to claim 1, wherein the step of associating a TMA value with a program task comprises identifying at least a first address range and a second address range used by the program task, and associating a first TMA value with the first address range and a second TMA value with the second address range.

5. The method according to claim 1, wherein the step of transferring comprises the steps of:
retrieving the data item from the storage resource in response to the data transfer request;
pre-processing the data item in a manner indicated by the TMA value; and
providing the pre-processed data item to the initiator resource.

6. The method according to claim 1, wherein the step of transferring comprises the steps of:
providing the data item from the initiator resource;
post-processing the data item in a manner indicated by the TMA value; and
storing the post-processed data item in the storage resource in response to the data transfer request.

7. The method according to claim 1, wherein the step of transferring a data item encrypts or decrypts the data item using a key value included within the TMA value.

8. The method according claim 1, wherein the step of transferring a data item performs a data format transformation.

9. The method according to claim 1, wherein the step of transferring a data item performs data compression or data decompression.

10. The method according to claim 1, wherein the step of transferring a data item at a selected address in the storage resource is performed in a first manner in response to a first TMA value for a first task, and wherein the step of transferring a data item at the selected address is performed in a second manner in response to a second TMA value for a second task.

11. A digital system comprising:
an initiator resource connected to a storage resource, the initiator resource operable to provide a data transfer request to the storage resource;
attribute circuitry connected to the initiator resource, the attribute circuitry operable to provide a task memory attribute (TMA) value with each data transfer request from the initiator resource to either read or write a data item to the storage resource, wherein for each data transfer request the attribute circuitry provides a TMA value selected with reference to a program task being executed at the time each data transfer request is initiated and an address range corresponding to an address specified in the data transfer request, wherein:
for a write data transfer request, the TMA indicates a manner of transforming the data item prior to storing the data item in the storage resource; and
for a read data transfer request, the TMA indicates a manner of transforming the data item after reading the data item from the storage resource and prior to reception of the data item by the initiator resource;
a transformation circuit connected between the storage resource and the initiator resource in a manner that data transferred between the initiator resource and the storage resource in response to a data transfer request can be transformed by the transformation circuit, wherein the transformation circuit is responsive to the TMA value provided with each data transfer request; and
a memory management unit (MMU) having a plurality of entry locations for holding a plurality of translated page address values and comprising the attribute circuitry, wherein each MMU entry location is operable to be loaded with a translated page address value and a TMA value.

12. The digital system according to claim 11 being a personal digital assistant, further comprising:
a display, connected to the initiator resource via a display adapter;
radio frequency (RF) circuitry connected to the initiator resource; and
an aerial connected to the RF circuitry.

13. A method for transferring data in a digital system between a storage resource and an initiator resource, comprising the steps of:
associating a task memory attribute (TMA) value with a computer executable program task;
storing a translated page address value in an entry location in a memory management unit (MMU) by selecting the translated address value from a page table;
storing the TMA value with the translated page address value in the MMU entry location by obtaining the TMA value from a task control block associated with the program task; and using the MMU entry location to provide a translated address and the TMA value with the data transfer request;

executing the program task;

providing the TMA value with a data transfer request from the initiator resource; and transferring a data item between the initiator resource and the storage resource, where the data item is processed in a manner indicated by the TMA value.

14. The method according to claim 13, further comprising the steps of:

storing a first task identification value associated with a first program task in a first MMU entry location, wherein the first MMU entry location also holds a first translated page address value and a first TMA value associated with the first program task;

executing a second program task that uses the first translated page value; and creating a different MMU entry for the second program task by storing a second task identification value and a second TMA value associated with the second task along with the first translated page value in a second MMU entry location.

15. A digital system comprising:

a storage resource connected to an initiator resource:

attribute circuitry connected to the initiator resource, the attribute circuitry operable to provide a task memory attribute (TMA) value with each data transfer request from the initiator resource to either read or write a data item to the storage resource, wherein the task memory attribute (TMA) value is associated with a computer executable program task;

a transformation circuit connected between the storage resource and the initiator resource in a manner that data transferred between the initiator resource and the storage resource in response to a data transfer request can be transformed by the transformation circuit, wherein the transformation circuit is responsive to the TMA value provided with each data transfer request; and a memory management unit (MMU) having a plurality of entry locations for holding a plurality of translated page address values and comprising the attribute circuitry, wherein each MMU entry location is operable to be loaded with a translated page address value and a TMA value.

* * * * *